United States Patent [19]
Gotham et al.

[11] 3,815,196
[45] June 11, 1974

[54] ROLLER HAVING A SHEET METAL SLEEVE AND INSERTED BEARINGS

[76] Inventors: Robert W. Gotham, 10 Cranmoor Dr., Toms River, N.J.; Robert J. McKnight, Jamestowne Village, Bldg. 10, Apt. 5, Freehold, N.J. 08753; Frank J. Neuwirth, 1210 Ivy Rd., Manasquan, N.J.

[22] Filed: Jan. 4, 1973

[21] Appl. No.: 320,949

[52] U.S. Cl. ............................................. 29/116 R
[51] Int. Cl. ............................................. B21b 13/02
[58] Field of Search .......................... 29/116 R, 110

[56] References Cited
UNITED STATES PATENTS

| | | | |
|---|---|---|---|
| 2,771,658 | 11/1956 | Morrill | 29/116 R X |
| 3,001,682 | 9/1961 | Carroll et al. | 29/116 R X |
| 3,119,137 | 1/1964 | Schueler | 29/116 R X |

*Primary Examiner*—Alfred R. Guest

[57] ABSTRACT

A metal roller with plastic bearings which have radially disposed ribs to resiliently hold them in place, and with a circular rib outstanding from the bearing so that contact with axle-supporting rail is reduced to a circular line rather than a plane surface.

4 Claims, 5 Drawing Figures

*INVENTOR.*
ROBERT W. GOTHAM
ROBERT J. McKNIGHT
BY FRANK J. NEUWIRTH

Robert J. McKnight

ATTORNEY

3,815,196

ROLLER HAVING A SHEET METAL SLEEVE AND INSERTED BEARINGS

This application is a continuation in part of our former application filed 3-19-71, Ser. No. 126,006 for "DISPLAY STAND WITH AUTOMATIC ROLLER SUPPORTED DELIVERY DEVICE & BEARINGS THEREFOR" for which U.S. Pat. No. 3,726,376 has been granted under classification "CONVEYOR ASSEMBLY."

SETTING AND OBJECTS OF THE INVENTION

This invention relates to tubular rollers and, more particularly, to those of the low cost type such as are used in gravity roller conveyors in live storage racks. This invention also relates to plastic bearings adapted to pressing into the ends of saw-cut welded tubing without the necessity of removing the weld flashings or burrs on the inside of the tubing.

An object of our invention is to provide an improved, low cost tubular roller with inserted bearings.

Another object of our invention is to provide a roller bearing which can be pressed into welded tubing without removal of weld flashing from the inside of tubing or burrs from the saw-cut ends of tubing.

A still further object of our invention is to provide a low cost bearing for a tubular roller with improved thrustbearing properties.

BACKGROUND OF THE INVENTION WITH REFERENCE TO PRIOR ART

Gravity roller conveyors usually consist of a pair of parallel side rails in which tubular rollers are mounted. Such rollers usually rotate on shafts which are supported in holes pierced in said side rails, and the shafts must be restrained against lateral movement so that they are properly retained. The tubes forming the rollers are rotatable on the shafts, usually on some type of ball-bearing to reduce friction. The hubs of the ball-bearings serve to restrain the rollers against lateral thrust action caused by sideways tilt of the conveyors or forces exerted in a transverse direction against the roller surface.

Ball bearings, even though they be of the non-precision type, constitute a substantial part of the cost of rollers used in such conveyors because so many are required and because rollers must usually be placed on fairly close centers; however, because the hub need not rotate, they are unaffected by rough surfaces of the supporting side rails such as burrs on the edges of punched holes usually used to support the roller axles and with which bearings may come in contact when the thrust forces are encountered in normal usage. On the other hand, plastic bearings of the flanged bushing type, having a flat surface adjacent and parallel to the side rails, will snag on such burrs and resist the rotation of the rollers. It is difficult to prevent such burrs in the normal fabricating processes and costly to remove them. With regard to the roller tubing, it has been customary to use drawn tubing which has no inner weld flashing because such flashing not only makes it difficult to insert metallic bearings but tends to affect the concentricity of the hub and roller tubing which is an important consideration in roller construction. Even when plastic bearings of the flanged bushing type are used, and the weld flashing can cut its own path through the bearing sleeve, the concentricity of the hub and tubing may be adversely affected. While it is possible to remove weld flashing from the inside of tubing, the cost of doing this is usually so great that manufacturers are persuaded to use higher cost drawn tubing. Burrs on the saw-cut ends of tubing cause peeling of the surfaces of the sleeves of the flanged bushing type plastic bearings resulting in improper seating of bearings and misalinement with roller shafts.

DETAILED DESCRIPTION OF A PREFERRED EMBODIMENT

Figure 1:
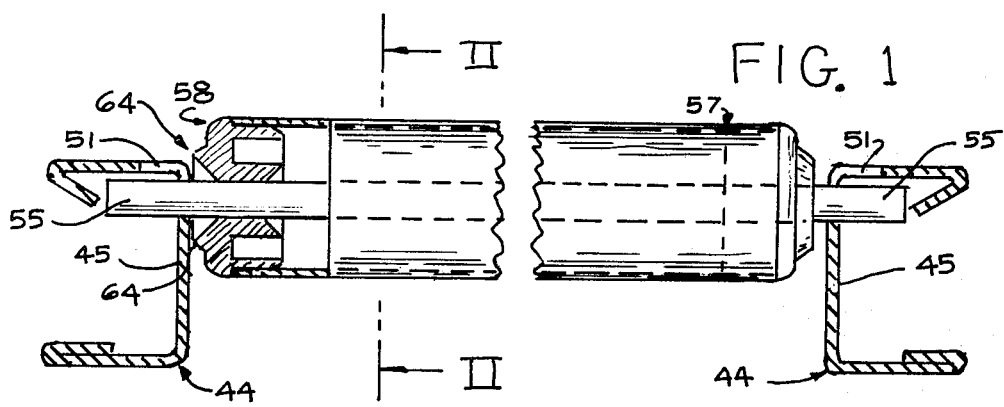
FIG. 1 is a side view of a roller supported by side rails at both ends with a cut-away section at one end showing bearing in contact with one side rail.

As shown in FIG. 1, a roller 57 is rotatably carried on axle 55. Roller 57 may be formed by bending a sheet of metal to make a hollow tube or cylinder and welding the meeting edges of said sheet to hold them together. The outer surface only of the cylinder is polished, leaving the inner surface rough along the meeting edges of the sheet where weld flashing may appear. The roller 57 is completed by frictionally mounting in each end an antifriction bearing 58, here shown as formed of plastic material having a low coefficient of friction with respect to its axle 55, desirably galvanized steel. The axle 55 is cradled in ovel-shaped holes 51 in side rails 44. A section of roller conveyor will contain a pleurality of rollers on spaced centers to constitute a runway. Rollers may be of any diameter and any required length. Holes 51 may be of any shape, including round.

Each bearing 58 for the goods-carrying rollers 57 is formed of plastic material, examples being nylon, "delrin" as manufactured by duPont, "celcon" as manufactured by Union Carbide, or other plastic material with a low coefficient of friction with respect to its carrying axle. Thus the rollers 57, with their so-formed antifriction bearings 58, will turn freely on their axles.

Each bearing, as shown in detail in FIGS. 2 to 5, inclusive, has a central aperture 59, of the proper size for receiving an axle, and an otherwise-closed circular portion 61 into which the aperture desirably flares as indicated at 62. The aperture 59 also desirably flares away from the hub portion 66, as indicated at 63. The outer surface of each circular portion 61 is formed with an outstanding circular rib 64, disposed between said aperture 59, or defined internally by the flare 62, and the periphery of said portion 61.

This rib 64 by having a diameter greater than that of the axle-receiving holes 59, not only reduces friction by spacing the body of the bearing from the inner surface of the adjacent rail, but also keeps said body away from the edge of the adjacent hole. Such hole may be sharp or rough, especially if formed by punching as contemplated.

A generally-cylindrical slightly flexible flange 65 extends inwardly so as to lie inside the end portion of the tubular part of an associated roller 57. The end wall extends radially outward of said flange to abut the end of said tubular part. There is also a hub portion 66 in which the aperture 59 is formed, said hub portion extending inward from the end wall 61. A series of radial webs 67 extend from the outer cylindrical surface of the hub portion 66 to the inner cylindrical surface of the flange 69. These webs 67, desirably eight in number and equally spaced, rigidize or rigidify the flange 65 to some extent, while allowing bending between adjacent webs.

Figure 2:
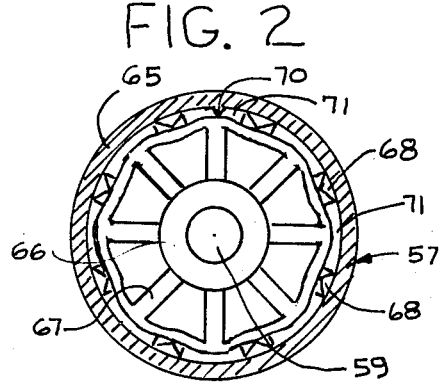
FIG. 2 is a transverse sectional view of the roller as on the line II — II of FIG. 1 in the direction of the arrows.
Figure 3:
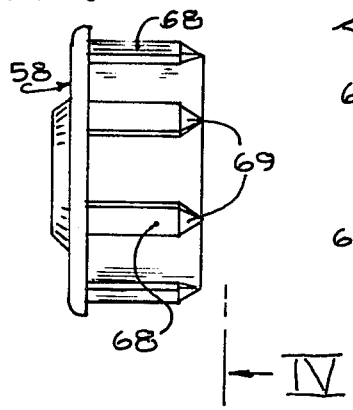
FIG. 3 is a side elevational view of one of the plastic bearings of the roller in FIG. 2.
Figure 4:
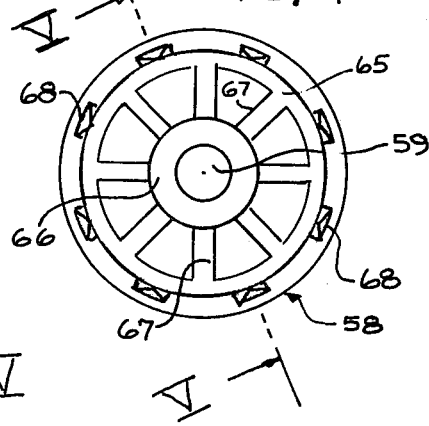
FIG. 4 is an inner face or axial view of the bearing of FIG. 3, as on the line IV — IV thereof, in the direction of the arrows.
Figure 5:
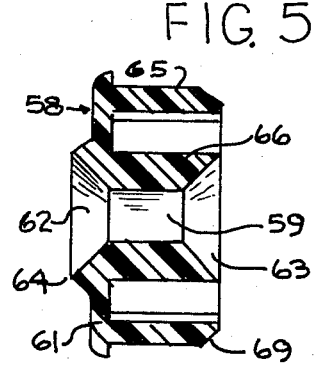
FIG. 5 is an axial sectional view of the bearing of FIG. 4 on the line V — V thereof, in the direction of the arrows.

Each flange 65 desirably carries a series of ribs 68 outstanding from the outer cylindrical surface thereof. Each rib 68 lies on a portion of the flange 65 which extends between adjacent pair of webs 67 and equidistant from said webs. Each bearing 58 is so formed that a circle circumscribed about the ribs 68 is slightly larger than the interior of a tube to form a roller so that, when said bearing is fitted therein, the engagement of the ribs with the inner surface of the tube causes deflection of the rib-carrying flange portions between said webs 67 and resilient gripping of said bearing in place, as illustrated in FIG. 2. The inner end portions of the ribs 68 are desirably slightly bevelled and tapered, as indicated at 69, to facilitate insertion in the end of a roller tube. The weld flashing 70 is accommodated in the space 71 between any two adjacent ribs.

ADVANTAGES OF DEVICES EMBODYING THE INVENTION

Resilient design permits a press-fit in tubing, the taper at the lead end of the ribs serving to brush aside burrs on saw-cut ends of tubing. Further, the open spaces between the ribs provides adequate accommodation for the weld flashing on the inner surface of the tubing without disturbing the concentricity of the hub bore and the inner wall of the tubing. Also, when bearings are pressed into tubing, the flange portions between the ribs are free to yield so that there is no peeling of the plastic ribs to cause distortion of the bearing and consequent loss of concentricity.

Another advantage is that the circular rib permits only a circular line contact with the adjacent rail, this contact being remote from possible burrs on the edge of the hole in which axle is mounted.

A still further advantage of our design is that the partially hollow construction not only reduces the cost of material but also results in better control over shrinkage and distortion during the cooling process resulting in greater dimensional consistency in the bearing.

Having now described our invention in detail in accordance with the requirements of the Patent Statutes, those skilled in this art will have no difficulty in making changes or modifications in the part in order to meet specific requirements or conditions. Such changes and modifications may be made without departing from the scope and spirit of the invention, as set forth in the following claims.

We claim:

1. A roller assembly consisting of a metal tube with plastic bearings frictionally inserted in each end thereof, each bearing having a central aperture to receive an axle, an otherwise closed circular end wall, a generally cylindrical flange extending inside the end portion of the tube, the end wall extending radially outward of said flange and abutting the end of said tube, a hub portion extending inward from said end wall, a series of webs extending radially from the outer surface of said hub portion to the inner surface of said flange, and a series of ribs outstanding from the outer surface of said flange which is slightly flexible between the webs, and each rib formed on a portion thereof midway between an adjacent pair of radial webs, said ribs being tapered to a plow shape on the end opposite the end wall, each bearing being formed so that a circumscribing circle about the ribs is initially slightly larger than the interior of the tube, whereby the engagement of the ribs with the inner surface of the tube, in which it is telescoped, causes deflection of the flanged portions carrying said ribs between said webs and resilient gripping of said bearing in place.

2. A roller assembly as recited in claim 1, wherein each bearing has, besides the central aperture, an otherwise closed circular end wall with an outstanding circular rib of substantially triangular cross-section outwardly and radially disposed between said aperture and the bearing periphery to restrict the contact of the bearing with the adjacent side rail supporting the axle to a thin contact face at a greater distance from the center of the aperture than half the width of the hole or slot into which the axle is inserted.

3. A bearing for a goods carrying roller, formed of plastic material with a central aperture to receive an axle, an otherwise closed circular end wall, a generally cylindrical flange adapted to extend inside the end portion of a tube, the end wall extending radially outward of said flange adapted to abut the end of a tube, a hub portion extending inward from said end wall, a series of webs extending radially from the outer surface of said hub portion to the inner surface of said flange, and a series of ribs outstanding from the outer surface of said flange which is slightly flexible between the webs and each rib formed on a portion thereof midway between an adjacent pair of radial webs, said ribs being tapered to a plow shape on the end opposite the end wall.

4. A bearing as recited in claim 3 wherein the end wall has an outstanding circular rib of substantially triangular cross-section outwardly and radially disposed between said aperture and its periphery to restrict the contact of the bearing with any surface with which it may abut to a thin contact face at a greater distance from the center of the aperture than half the width of the aperture.

* * * * *